US010343335B2

United States Patent
Morovic et al.

(10) Patent No.: US 10,343,335 B2
(45) Date of Patent: Jul. 9, 2019

(54) THREE DIMENSIONAL MATERIAL DISTRIBUTION USING OCTREES

(71) Applicant: Hewlett-Packard Development Company, L.P., Houston, TX (US)

(72) Inventors: Jan Morovic, Colchester (GB); Peter Morovic, Sant Cugat del Valles (ES); Jay S. Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/564,405

(22) PCT Filed: Jul. 15, 2015

(86) PCT No.: PCT/US2015/040592
§ 371 (c)(1),
(2) Date: Oct. 4, 2017

(87) PCT Pub. No.: WO2017/011007
PCT Pub. Date: Jan. 19, 2017

(65) Prior Publication Data
US 2018/0133972 A1 May 17, 2018

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/165* (2017.08); *B29C 64/386* (2017.08);
(Continued)

(58) Field of Classification Search
USPC ........................................................ 700/119
See application file for complete search history.

(56) References Cited

U.S. PATENT DOCUMENTS

| 6,021,358 A | 2/2000 | Sachs | |
| 7,406,361 B2 * | 7/2008 | Ohmori | B33Y 50/02 264/401 |

(Continued)

FOREIGN PATENT DOCUMENTS

| JP | 2539435 | 10/1996 |
| WO | WO-2011042899 | 4/2011 |

OTHER PUBLICATIONS

Wonjoon Cho, et al., "A Dithering Algorithm for Local Composition Control with Three-Dimensional Printing", Dec. 21, 2001, pp. 26. http://www.mit.edu/~tdp/info-flow/publications/dither_algo.pdf.
(Continued)

*Primary Examiner* — Mohammad Ali
*Assistant Examiner* — Joshua T Sanders
(74) *Attorney, Agent, or Firm* — HP Inc. Patent Dpt.

(57) ABSTRACT

Certain examples described herein relate to producing three-dimensional objects using additive manufacturing systems. These examples combine the use of material volume coverage vectors to define object data with octree data structures and models for tracking material placement error and available volumes. Material volume coverage vectors correspond to a volumes of three-dimensional objects and define a probabilistic distribution of materials available to an additive manufacturing system including combinations of said materials. In certain examples, a bottom level of the error tracking octree model is constructed to contain at least a portion of the data values for a set of obtained material volume coverage vectors. This is then used in an error distribution process to generate manufacturing control data for the additive manufacturing system.

15 Claims, 3 Drawing Sheets

(51) Int. Cl.
      *B33Y 30/00*          (2015.01)
      *G05B 19/4099*    (2006.01)
      *B29C 64/165*      (2017.01)
      *B29C 64/386*      (2017.01)

(52) U.S. Cl.
      CPC .............. *B33Y 30/00* (2014.12); *B33Y 50/02* (2014.12); *G05B 19/4099* (2013.01); *G05B 2219/49023* (2013.01)

(56) References Cited

U.S. PATENT DOCUMENTS

| | | | |
|---|---|---|---|
| 2006/0156978 A1* | 7/2006 | Lipson | A61L 27/36 |
| | | | 118/708 |
| 2014/0031967 A1 | 1/2014 | Unger et al. | |
| 2014/0312535 A1 | 10/2014 | Dikovsky et al. | |
| 2014/0324204 A1 | 10/2014 | Vidimce et al. | |
| 2015/0148930 A1 | 5/2015 | Kumar et al. | |

OTHER PUBLICATIONS

International Search Report and Written Opinion dated Apr. 15, 2016, PCT Patent Application No. PCT/US2015/040592, filed Jul. 15, 2015, Korean Intellectual Property Office.
Chen, D. et al., "Spec2Fab: A Reducer-Tuner Model for Translating Specifications to 3D Prints", Jul. 15, 2007, pp. 9. http://spec2fab.mit.edu/Spec2Fab.pdf.

* cited by examiner

THREE DIMENSIONAL MATERIAL DISTRIBUTION USING OCTREES

CLAIM FOR PRIORITY

The present application is a national stage filing under 35 U.S.C. § 371 of PCT application number PCT/US2015/040592, having an international filing date of Jul. 15, 2015, the disclosure of which is hereby incorporated by reference in its entirety.

BACKGROUND

Additive manufacturing systems that generate three-dimensional objects, including those commonly referred to as "3D printers", have been proposed as a potentially convenient way to produce three-dimensional objects. These systems may receive a definition of the three-dimensional object in the form of an object model. This object model is processed to instruct the system to produce the object using one or more material components. This may be performed on a layer-by-layer basis. The processing of the object model may vary based on the type of system and/or the production technology being implemented.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

In certain additive manufacturing systems, material is successively deposited to build up a three-dimensional object. This object can be used for a variety of applications including the construction of prototypes, the production of on-demand functional parts and variable or low-volume (including one-off) computer aided manufacturing. In certain systems, multiple materials may be used. This may enable the production of objects with selectable and variable characteristics. For example, amongst other characteristics, variability may be controlled for one or more of the following: material properties, mechanical properties, color, detail, flexibility, roughness, conductivity, and magnetism. Other properties may also exist. In these multi-material systems, it is desired to accurately specify and deposit available production materials and their combinations, e.g. in terms of sub-volumes of a given object. In certain cases these sub-volumes may relate to a single production resolution voxel.

Certain examples described herein enable precise control over material composition placement in an additive manufacturing system. In these examples material compositions include materials available to an additive manufacturing system and their combinations. In certain cases, material composition placement for defined volumes of a three-dimensional object may be controlled in a holistic manner that takes into account previously placed material compositions. Certain examples enable data for three-dimensional objects to be defined in a manner that enables a high degree of control and specificity with regard to per volume material compositions. This is achieved by using material composition distributions, e.g. in the form of probability values or percentages, that are then used as an input for an octree-based error diffusion operation. The octree-based error diffusion operation uses both an error tracking octree and an open or available volume tracking octree. In this manner, volume connectivity may be controlled, e.g. by appropriately configuring the volume tracking octree during error distribution. This also enables close tuning to object geometry constraints. Certain examples efficiently combine these approaches, e.g. material composition distributions and octree-based error diffusion. Such an efficient combination reduces possible dimensionality overheads, e.g. with regard to computation, that may result from the use of material composition distributions and allows the full benefit of controllable error diffusion. This in turn allows the production of complex multi-material and multi-property three dimensional objects at a high detail resolution.

Figure 1:
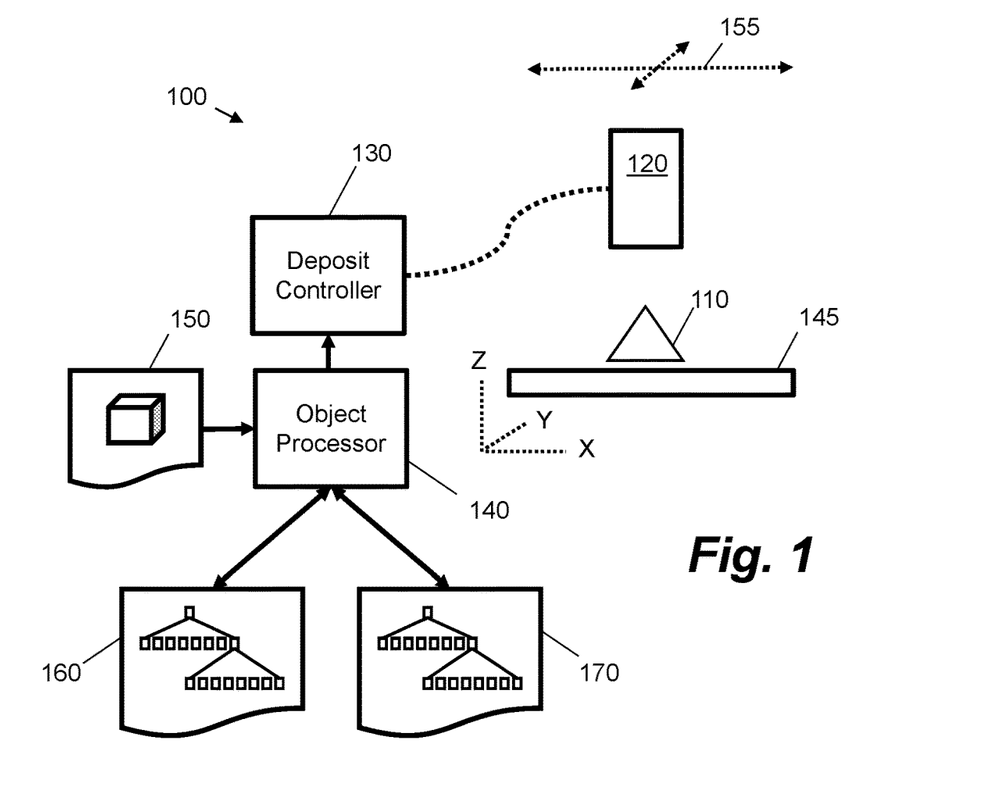
FIG. 1 is a schematic diagram showing an additive manufacturing system according to an example.

FIG. 1 shows an example of an additive manufacturing system 100 arranged to produce a three-dimensional object 110. In FIG. 1, the additive manufacturing system 100, which may comprise a so-called "3D printer", comprises a deposit mechanism 120, a deposit controller 130, and an object processor 140. The deposit mechanism 120 is arranged to deposit a plurality of materials to generate the three-dimensional object 110. Examples of these materials are discussed in more detail below; they may comprise, for example, clear and/or colored agents (such as binding or coalescing agents) for use on a substrate and/or directly deposited polymer compositions. In FIG. 1, the deposit mechanism 120 is communicatively coupled to the deposit controller 130, e.g. through one or more wired and/or wireless interfaces. The deposit controller 130 is arranged to control the deposit mechanism based on manufacturing control data. The manufacturing control data indicates placement instructions for the plurality of materials. For example, these instructions may comprise firing signals for at least one printhead configured to deposit a particular material. These firing signals may be associated with a particular location in two or three dimensional space. As shown in FIG. 1, the three-dimensional object 110 may be constructed upon a platen 125. The deposit mechanism 120 may be moveable relative to the platen 125 in order to deposit materials at a particular print resolution. This is indicated by arrows 155. The three-dimensional object 110 may be constructed layer-by-layer, in which case the deposit mechanism 120 may deposit material onto each layer. In this case, placement instructions may relate to the placement of an available material or material combination at a particular print-resolution pixel for a particular layer (e.g. to deposit a material composition for a voxel associated with the layer).

In FIG. 1, the object processor 140 is arranged to obtain object data 150 for the three-dimensional object 110 and to generate the manufacturing control data for the deposit controller 130. In the present example, the object processor 140 is arranged to obtain object data comprising material volume coverage vectors. These material volume coverage vectors are discussed in more detail below. Each material volume coverage vector corresponds to a respective volume of the three-dimensional object, e.g. object data may be defined by a plurality of voxels wherein each voxel has an associated material volume coverage vector. Each material volume coverage vector defines a probabilistic distribution of the plurality of materials available via the deposit mechanism 120 including combinations of said materials, i.e. each component in the vector relates to a particular material composition or state including a blank or empty state, individual material use and combinations of materials.

The object processor 140 of FIG. 1 is arranged to access two octree data structures 160, 170 to generate the manufacturing control data. A first octree data structure 160 implements an error-tracking octree model to track a placement error when generating the manufacturing control data. The second octree data structure 170 implements a volume-tracking octree model to track volumes that are to be assigned placement instructions. The object processor 140 is arranged to populate a bottom level of the first octree data structure 160 with at least a portion of the data values for the material volume coverage vectors and to generate the manufacturing control data by distributing error values from the first octree data structure 160 to available volumes represented in the second octree data structure 170. In certain cases, the object processor 140 may be arranged to dynamically control, i.e. configure, available volumes indicated in the second octree data structure 170 according to a defined connectivity pattern. In certain cases, the octree data structures may be used to ensure that error for a particular material composition is not distributed to a voxel that has a zero value for a vector component corresponding to the material composition.

One or more of the deposit controller 130 and the object processor 140 may comprise one or more processors that form part an embedded computing device, e.g. adapted for use in controlling an additive manufacturing system. They may also comprise volatile and/or non-volatile memory, e.g. a non-transitory storage medium, arranged to store machine readable instructions, e.g. in the form of firmware. In one case, the functionality of the deposit controller 130 and the object processor 140 may be combined in one embedded system that is arranged to receive object data 150, or data useable to produce the object data 150, and control the additive manufacturing system 100. This may be the case for a "stand alone" apparatus that is arranged to receive model data, e.g. by physical transfer and/or over a network and in a three dimensional model file format, and produce an object accordingly. In one case, the additive manufacturing system 100 may comprise a distributed computing system, e.g. deposit controller 140 may form part of a "3D printer", whereas the object processor 140 may be implemented, at least in part, by a "3D print driver" on a client device; this may be the case if the client device is arranged to send a "3D print job" comprising the object data 150, or data useable to produce the object data 150, to an apparatus containing the deposit mechanism 120 in the manner of a two-dimensional printer.

The object processor 140 may be arranged to: retrieve the object data 150 as a file from a file system; comprise an application programming interface that is passed the object data 150 and/or an address of data making up the object data; and/or comprise a receiver arranged to receive the object data 150 from a network device, e.g. a commutatively coupled computer configured to "print" the three-dimensional object via a print driver. In the last case the object data 150 may comprise the result of processing by a print driver. In one case, the object data 150 and/or the manufacturing control data may be stored, e.g. in a computer readable medium, to be accessed at a later point in time by a controller of an additive manufacturing system. In another case, the manufacturing control data may be passed to the deposit controller 130 from the object processor 140, e.g. via a network or other communication coupling.

In certain examples described herein a material volume coverage representation is used. This representation comprises material volume coverage vectors for volumes of the three-dimensional object. In one case, these volumes may comprise voxels forming part of a raster representation of the three-dimensional object. This raster representation, e.g. a representation based on repeated rectangular or cubic volume units within a defined grid, may be generated based on a vector representation, e.g. a geometric definition of shapes making up an object. In one case, cubic volumes may be used with a common value for each of the height, width and depth of a voxel. In other cases, custom unit volumes or voxels may be defined, e.g. where the unit volume is non-cubic and/or has values of height, width and depth that differ from each other with (although each voxel has the same height, width and depth as other voxels in the raster representation). In certain cases, the unit volume or voxel may be a non-standard or custom-defined three-dimensional shape, e.g. voxels may be based on Delaunay tessellations (e.g. tetrahedra that fill the object) or any other space-filling polyhedra. In this case, the material volume coverage representation may be stored as a set of tuples (e.g. in an array-type structure) with one component of the tuple representing a voxel co-ordinate in three dimensions (e.g. a centroid or bottom corner) and another component of the tuple representing a material volume coverage vector.

To explain the components of a material volume coverage vector, a simple example may be considered. In this simple example, an apparatus is arranged to use two materials to generate a three-dimensional object: M1 and M2. These may be fluid build materials that are deposited on a substrate or platen, e.g. excreted or ejected molten polymers, or they may comprise two colored agents that are deposited on one or more layers of powdered build material. In the latter case, in a produced three-dimensional object, each "material composition" may correspond to a combination of at least one agent and at least one powdered build material, wherein energy is applied to coalesce the combination (e.g. by melting of at least the build material). If there is a single powdered substrate, each component of the material volume coverage vector may relate to an agent or combination of said agents. In the former case, in a produced three-dimensional object, each "material composition" may correspond to a solidified portion of excreted or ejected polymer or polymers. A "material composition" may comprise zero or more "materials" that are available for deposit and/or mixing by an additive manufacturing apparatus to generate a defined volume (e.g. at the production resolution) of an output three-dimensional object. These "materials" may comprise, amongst others, any combination of: different build materials, different binders, different material property modifiers, different build powders, different agents, different epoxies and different inks.

In this simple example, if the additive manufacturing apparatus is arranged to deposit discrete amounts of each material, e.g. in binary deposits, there are four different material compositions or states: a first state for the deposit of M1 without M2; a second state for the deposit of M2 without M1, a third state for the deposit of both M1 and M2, e.g. M2 deposited over M1 or vice versa; and a fourth state for an absence of both M1 and M2, e.g. "blank" (Z) or an inhibitor. In this case, the material volume coverage vector has four vector components: [M1, M2, M1M2, Z]. In the case of the last vector component, "blank" or "Z" may represent "empty" or an absence of materials in a processed layer, e.g. if agents are deposited on layers of build material this may denote an absence of build material for the processed layer, even though the build material may not be removed until the complete object has been produced. In certain cases, a blank or empty component may also be associated with a coalescence inhibitor, e.g. an agent that prevents a substrate solidify during a curing operation.

In one case, the object processor 140 may be arranged to apply the first and second octree data structures to non-blank volumes in the material volume coverage vectors obtained with the obtained object data. For example, the object data may be parsed to determine material volume coverage vectors that have a "blank" or "empty" value of less than 1 (using a 0-1 range) or 100% (using an equivalent percentage range)—i.e. material volume coverage vectors that have a "blank" or "empty" value of 1 or 100% are deemed to be "blank". For example, a three-dimensional object may comprise a rasterized voxel representation present within a defined cubic grid, e.g. of X by Y by Z voxels. Not all of these voxels may be taken up with the three-dimensional object, e.g. exterior portions of an object may be "blank" or "empty". This approach may help simplify the error diffusion process, e.g. as there will be a material value error to distribute for non-blank voxels but voxels that are blank do not need to be processed as they do not receive any diffused error.

The above example using material volume coverage vectors may be contrasted with a comparative method that associates material proportions to each voxel, e.g. in a similar manner to continuous tone definition before halftoning. In these comparative methods, a percentage of each of materials M1 and M2 are defined for each voxel, e.g. [M1, M2] wherein the vector is normalized to 1 (for ranges of 0-1) or 100% (for percentage ranges). In this comparative case, there is no consideration of the combination of M1 and M2, nor is there a consideration of the absence of both materials. As such these comparative methods do not consider material combinations; without considering the material combinations the defined material proportions cannot be linearly combined and exhibit non-linearities that make processing problematic. Additionally, the definition and use of material combinations provide more accurate and exact control of the materials that are used. For example, particular values for a given percentage of each of materials M1 and M2 as defined for a voxel, e.g. [M1=0.5, M2=0.5], may be controlled using a plurality for material volume coverage vector values, e.g. various combinations of M1, M2 and M1M2. Defining the absence of any material ("Z") as a particular material combination also further facilitates this control.

More generally, for an additive manufacturing apparatus having k available materials and L discrete deposit states for said materials, a material volume coverage vector comprises $L^k$ vector components, each vector component representing an available material/deposit state combination, including separate and joined use and an absence of any material. Or in other words, the vector components of a material volume coverage vector represent all materials available to an apparatus and their combinations, they are an enumeration of possible build or deposit states available to the apparatus. The vector components may be considered analogous to the concept of Neugebauer Primaries in color printing. In this analogy, each vector component may be considered to comprise a volume coverage of a "material primary". As such the material volume coverage vector has a dimensionality representative of these states and contains the volume coverages (e.g. probabilities) associated with each state. Or in other words, a material volume coverage vector comprises weighted combinations or probabilities of material primaries. This compares to the comparative methods discussed above that have k vector components. The present examples that use material volume coverage vectors and the comparative methods described above rapidly diverge when a plurality of materials are available with a plurality of production build states; material volume coverage space is much greater than comparative material representation spaces. Another distinction when compared to comparative methods is that any materials available to the apparatus may be included in the material volume coverage vector, e.g. this need not be limited to available colored build materials.

In the example of FIG. 1, the distribution of errors by the object processor 140 may be seen as part of an error diffusion operation. This error diffusion operation in turn may implement a halftoning operation. This halftoning operation is applied to the object data 150 comprising the material volume coverage representation to generate a halftone output that comprises, or is useable to generate, manufacturing control data in the form of discrete material deposit or placement instructions for the additive manufacturing system 100. In certain cases, the object processor 140 may be arranged to receive object data 150 at a first resolution and output discrete material deposit instructions at a second resolution, where the two resolutions differ. The second resolution may be set by at least one of: the two-dimensional addressability of the deposit mechanism and a height of any z-axis layer that is used. In one case the first resolution may be higher than the second resolution. In one case, a deposit mechanism may be arranged with multiple printheads, each printhead being arranged to eject a different agent onto an addressable area of a layer of substrate. In this case, the placement instructions may comprise firing instructions for each printhead, wherein mixtures of materials may be implemented by sending firing instructions for two or more printheads in relation to a common addressable area (e.g. to "print" a voxel having a material composition equal to the combination of agents from the two or more printheads and a base powdered substrate).

Figure 2:
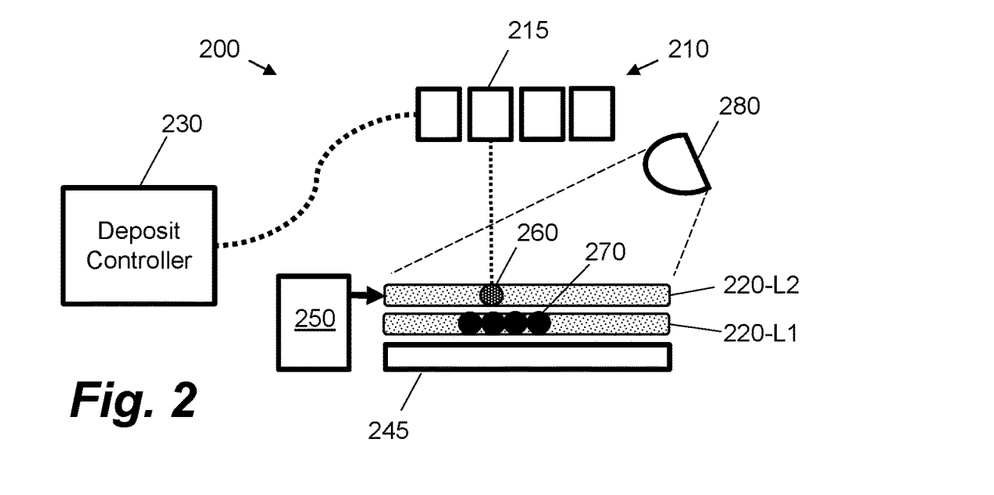
FIG. 2 is a schematic diagram showing components of an additive manufacturing system according to an example.

FIG. 2 shows an example 200 of an additive manufacturing system that uses an inkjet deposit mechanism 210 to print a plurality of liquid agents onto layers of a powdered substrate. Although the examples described herein may be applied to different types of additive manufacturing system, the example 200 of FIG. 2 will be used for ease of reference to further explain the concepts disclosed herein. In other implementations the combination of material volume coverage vectors and octree error diffusion may be used with, amongst others, selective laser sintering systems, stereo lithography systems, inkjet systems, fused deposition modelling systems, any three-dimensional printing system, inkjet deposition systems and laminated object manufacturing systems. These include apparatus that directly deposit materials rather than those described that use various agents.

In FIG. 2, the inkjet deposit or print mechanism 210 implements the deposit mechanism 120 of FIG. 1. The inkjet deposit mechanism 210 in this example comprises four inkjet printheads 215. Each inkjet printhead is adapted to deposit an agent onto a powdered polymer substrate 220. In particular, each, inkjet printhead is arranged to deposit a particular agent upon defined areas within a plurality of successive substrate layers. An agent may act as a coalescing agent (e.g. a binder) or as a coalescing inhibitor. As described above the latter may implement a "blank" or "empty" material composition. In FIG. 2 the inkjet print mechanism 210 is communicatively coupled to a deposit controller 230, which implements the deposit controller 130 shown in FIG. 1. Further components shown in FIG. 1, such as the object processor 140, may be present but are not shown for clarity.

In FIG. 2, the additive manufacturing system comprises a substrate supply mechanism 250 to supply at least one substrate layer upon which the plurality of materials are deposited by the deposit mechanism 210. In this example the substrate supply mechanism 250 comprises a powdered substrate supply mechanism to supply successive layers of substrate. Two layers are shown in FIG. 2: a first layer 220-L1 upon which a second layer 220-L2 has been deposited by the substrate supply mechanism 250. In certain cases, the substrate supply mechanism 250 is arranged to move relative to the platen 245 such that successive layers are deposited on top of each other.

In the present example, the additive manufacturing system also comprises a fixing system 280 arranged to apply energy to form portions of the three-dimensional object from combinations of the agents and the powdered substrate. For example, FIG. 2 shows a particular printhead 215 depositing a controlled amount of a fluid agent onto an addressable area of the second layer 220-L2 of powdered substrate. The fluid agent is absorbed by the powdered substrate and as such a drop of agent on an addressable area unit of the layer relates to a print resolution voxel 260, wherein the height of the voxel in the z-dimension is controlled by the depth of each substrate layer. The placement instructions discussed above may control the operation of the printhead 215 to form the voxel 260. Following application of the agent the fixing system 280 is arranged to fix or solidify the portion of the layer 260. In one case, the fixing system 280 may apply energy to a combination of coalescing agent and substrate, wherein presence of a coalescence inhibitor prevents this fixing. The application of energy may melt the substrate, which then mixes with the agent and subsequently coalesces. In this example, use of coalescing agents and inhibitors may allow a three-dimensional object to have varying material properties. They may form part of the "materials" of the material volume coverage vector. In one case, the fixing system 280 may comprise an energy source such as a ultra-violet or infra-red light source, e.g. a lamp or laser. FIG. 2 shows four print resolution voxels 270 that have been fixed in the first layer 220-L1. As such, the voxel 260 may be built on these previous voxels 270 to build the three-dimensional object. Lower layers of substrate may also provide support for overhanging fixed portions of a three-dimensional object, wherein at the end of production the substrate is removed to reveal the completed object.

When using the example 200 of FIG. 2, there may be four agents —[A1, A2, A3, A4], wherein each agent relates to a different material property (e.g. color, elasticity, conductivity etc.). Assuming a binary print mechanism, e.g. each printhead may deposit 0 or 1 drops of agent, then a material volume coverage vector has $2^4$ or 16 vector components: [A1, A2, A3, A4, A1A2, A1A3, A1A4, A2A3, A2A4, A3A4, A1A2A3, A1A2A4, A1A3A4, A2A3A4, A1A2A3A4, Z], where Z is blank or empty. For example, a material volume coverage vector may have a value of [0, 0.1, 0, 0, 0.2, 0, 0, 0.1, 0, 0, 0, 0, 0.5, 0, 0.1], representing volumetric coverage values for a voxel of A2—10%, A1A2—20%, A2A3—10%, A2A3A4—50% and Z—10%. As can be seen this material volume coverage vector cannot be directly printed, each of the four printheads can deposit a drop of agent or not; hence, the error diffusion process is used to determine discrete material placement instructions (such as inkjet printhead 1 eject a drop of agent at z-layer 4 at [x,y] co-ordinate [7,1] and inkjet printhead 3 also eject a drop of agent at the same location).

Certain examples described herein use octrees to implement an error diffusion process. An octree is a tree data structure in which each internal node or cell has exactly eight children. Octrees enable a three dimensional space to be partitioned by recursively subdividing the space into eight octants. An octree data structure may define each node of the tree or cell of space by a co-ordinate in three-dimensional space, or by a volume definition in said space. Octree data structures may be implemented using available libraries of programming languages and/or by defining a data structure, e.g. arrays or dictionaries or the like, where each parent element of the data structure is linked to eight child elements.

Figure 3:
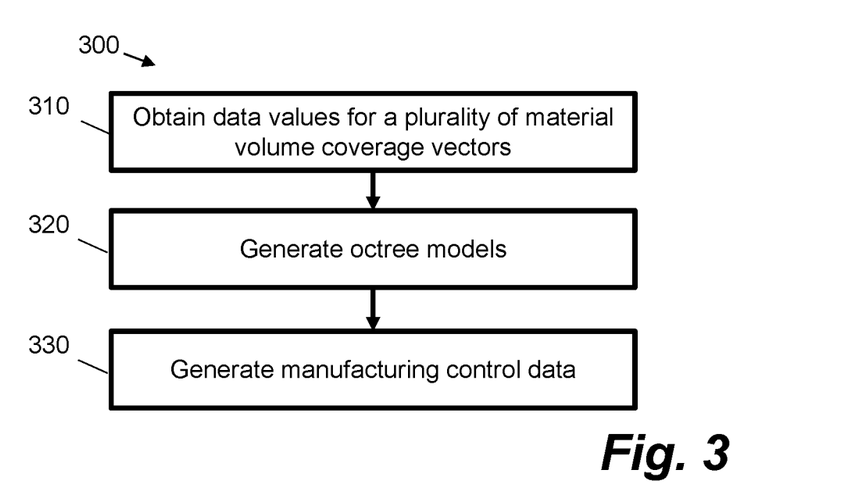
FIG. 3 is a flow diagram showing a method of determining material placement for production of a three-dimensional object according to an example.

FIG. 3 shows a method 300 of determining material placement for production of a three-dimensional object. This method may be implemented, for example, by the object processor 140 of FIG. 1. The output of the method may then be used by deposit controller 130 to generate or "print" a three-dimensional object.

At block 310, data values for a plurality of material volume coverage vectors are obtained. As described above, each material volume coverage vector corresponds to a respective volume of the three-dimensional object and defines a probabilistic distribution of materials available to an additive manufacturing system for production of the three-dimensional object including combinations of said materials.

At block 320, an error tracking octree model and an available-volume tracking octree model are generated for determining placement of the materials available to the additive manufacturing system. The octree models may be implemented using octree data structures. In this block, a bottom level of the error tracking octree model, e.g. corresponding to the highest resolution or most detailed representation in the octree model, comprises at least a portion of the data values for the plurality of material volume coverage vectors. For example, if the object data comprises material volume coverage vector values for each voxel of a defined three-dimensional model space then these voxels are set as the bottom level of the octree model and the values are corresponding assigned.

At block 330, manufacturing control data is generated using the octree models. This involves generating manufacturing control data indicative of placement instructions for the materials available to the additive manufacturing system by distributing error values from the error tracking octree model to available volumes represented in the available-volume tracking octree model.

In certain cases, levels of the error tracking octree model that are higher than the bottom level comprise weighted sums of material volume coverage vector values associated with corresponding (e.g. child) cells of the octree at a lower level. This is possible as the material volume coverage representation allows weighted summation; this would not be possible with the comparative example described above. For example, a given cell above the bottom level may comprise the weighted sum of its child elements. In an octree a parent node or cell that has unit height, width and depth (e.g. in x, y and z directions) may comprise child nodes or cells that have ½ unit height, width and depth (i.e.

⅛th of the volume of the parent node or cell). At a highest resolution, eight voxels may have various amounts of material compositions specified per node. The parent node will contain a sum of all material compositions specified for the children nodes.

The available-volume tracking octree model enables voxels that are available for material placement to be tracked. The available-volume tracking octree model may represent particular cells as "open" or "closed", e.g. able for material placement or not. To place a single element, the trees are searched, selecting at each level a voxel with large error that has at least one open element designated for that material composition. The order that cells are examined for applicability maybe randomized to produce better distribution of the resulting elements. After an element is placed, its voxel is marked as closed for each material composition, and both the error-tracking and available-volume octrees are updated. The end result of the process is that each voxel contains a discrete material composition, e.g. 100% of one of the material volume coverage vector components. This may then be used to control deposit of material (e.g. 100% of A1 may be used to instruct one drop of agent 1 at a given layer location associated with the voxel, whereas 100% of A2A3A4 may be used to instruct each of three printheads associated with agents 2, 3 and 4 to print one drop).

In certain cases, the available-volume tracking octree model may be controlled (e.g. configured) to allow conditional relationships to be specified during the placement of materials. For instance, some material combinations may trigger a distribution of error for some of the other materials so that adjacency and clustering of material voxels may be controlled. For example, after placing a voxel of a material or combination of materials, error might be locally distributed to either repel or attract the placement of other materials.

Figure 4:
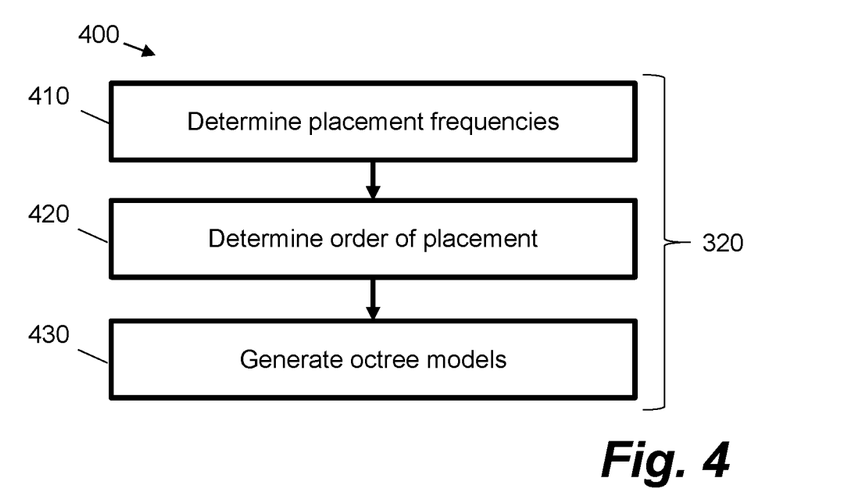
FIG. 4 is a flow diagram showing sub-blocks for generating octree models according to an example.

FIG. 4 shows sub-blocks 400 that may be used to implement block 320 of FIG. 3 in certain examples. At sub-block 410, placement frequencies for each material composition, e.g. the materials available to the additive manufacturing system, are determined. This is performed based on the obtained data values by summing components of the material volume coverage vector across a total volume of the three-dimensional object. For example, if a material volume coverage vector has a "M1M2" component representing a mixture of materials 1 and 2, then values for that component from all voxels may be summed, e.g. 0.1+0.2+0 . . . +0.7. The result of this summation is a number of times that the particular component needs to be placed in the manufacturing control data. In a case, where the object data is at a resolution that is different from a print resolution then volume weighting may be applied to determine placement frequencies at the print resolution.

Following sub-block 410, an order of placement for the materials available to the additive manufacturing system, e.g. material compositions, is determined at sub-block 420 based on the placement frequencies. For example, material compositions may be ranked by order of frequency in the object data, i.e. based on a number of times a particular material composition needs to be placed. At sub-block 430, the error tracking octree model and the available-volume tracking octree model are generated based at least one of the placement frequencies and the order of placement. For example, material compositions that are placed sooner by an error diffusion process may be distributed more optimally (e.g. as there is greater freedom over placement), whereas material compositions that are placed later may be pre-constrained by previously placed material compositions, e.g. there may be a smaller number of available volumes for placement. In one case, material compositions may be placed in total in the determined order of placement, e.g. if an order is {M1M2, M1, M2}—place all voxels of M1M2, then all voxels of M1, then all voxels of M2. In another case, material compositions may be placed in a round robin or cycled manner, e.g. for the same order, place one voxel of M1M2, then one voxel of M1, then one voxel of M2, then repeat the process starting at one voxel of M1M2 again. This may be repeated until all material compositions are placed.

In the above example, the error diffusion process places one material composition at a time. Therefore an ordering of material compositions (i.e. components of a material volume coverage vector) may be used to instruct an iteration order for the total number of available material compositions to be placed (i.e. all the components of a material volume coverage vector about from "blank" or "empty"). In other cases, the placement frequencies may form part of a compound function to determine an order of placement. For example, when using colored materials it may be desired to place darker material compositions before lighter material compositions; in this case, color may constraint the order of placement together with the placement frequencies.

Figure 5:
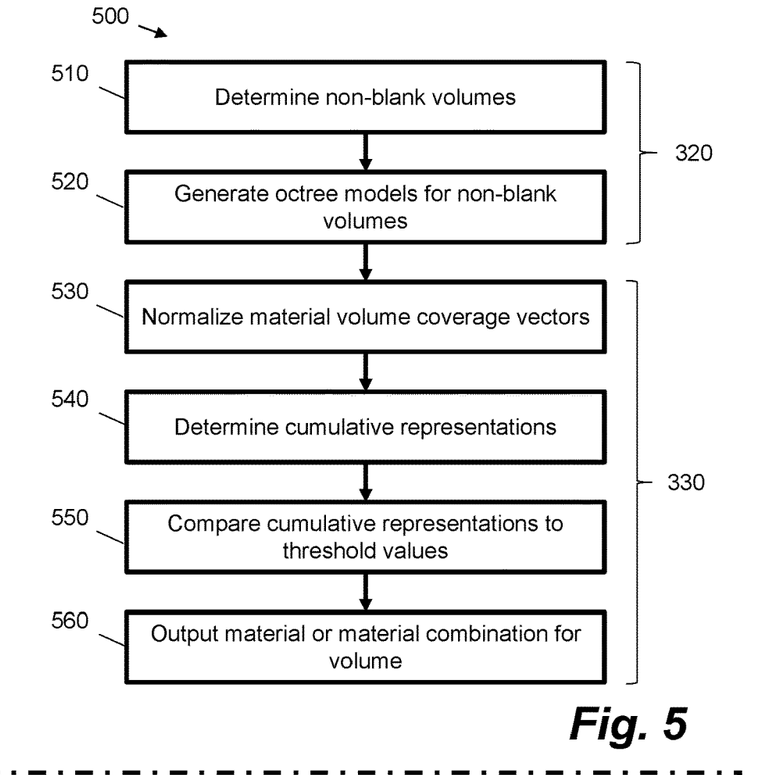
FIG. 5 is a flow diagram showing sub-blocks for generating octree models and manufacturing control data according to an example.

FIG. 5 shows an example of sub-blocks 500 that may be used to implement blocks 320 and 330 of FIG. 3. They may be applied separately or in combination with the sub-block of FIG. 4. As before, these sub-blocks may be performed by the object processor 140 of FIG. 1.

At sub-block 510, volumes associated the three-dimensional object than have non-blank values are determined. For example, this may comprise filtering the voxels of an object file for those that have a "blank" or "empty" ("Z") component value of less than 1 or 100%. A list or map may be constructed that labels voxels as blank or non-blank.

In the example of FIG. 5, the blocks of generating the error tracking octree model, the available-volume tracking octree model and the manufacturing control data is performed in relation to the determined non-blank volumes. With reference to FIG. 4, sub-blocks 410 and 420 may also be performed in relation to non-blank voxels, e.g. blank voxels being ignored. With reference to sub-block 410, this results in numbers of non-blank voxels for use in printing or producing the defined three-dimensional object. At sub-block 520, the error tracking and available-volume tracking octree models are generated for the non-blank voxels. For example, the error-tracking octree may comprise, at a bottom level, non-blank material volume coverage vector values. Generating the manufacturing control data in this case involves selecting a particular non-blank material volume coverage vector component for each print resolution voxel.

Sub-blocks 530 to 560 in FIG. 5 show a particular example for implementing block 330 of FIG. 3, i.e. the block of generating manufacturing control data. At sub-block 530, material volume coverage vectors are normalized. This may comprise removing a blank or empty component and redistributing the remaining vector components such that the material volume coverage vector values sum to unity. For example, a material volume coverage vector having values, before sub-block 530, of: [Z, A1, A2, A1A2]=[60%, 10%, 10%, 20%] may be normalized to include non-blank vector components, e.g.: [0%, 25%, 25%, 50%] (which comprises the values 10%, 10% and 20% scaled to sum to unity, i.e. 100%). At sub-block 540, cumulative representations of the normalized material volume coverage vector values are determined. In the given example, this may equal: [0%, 25%, 50%, 100%]. In this example, the cumulative representations are used to determine a material or a material combination, i.e. a material composition, to place at an available volume.

In the example of FIG. 5, at sub-block 550 the cumulative representations are compared with a threshold value to determine a material composition to place. In one case, a random number may be generated, e.g. using a programmatic or electronic random number generator. This may be a number between 0 and 1 (or 0% and 100%) that is generated based on a uniform probability distribution. This number may be compared against the values of the cumulative representation and a material composition may be selected based on a vector component from the cumulative representation that represents a range associated with the threshold value. For example, in the above case, a random value of 35% would be associated with the material composition A2, as in the cumulative representation A2 has a value of 50% and A1 has a value of 25%, as such A2 is associated with a range from 25% to 50% into which the value of 35% falls. Similarly, a random value of 65% would cause a material composition of A1A2 to be selected, as it falls within the range 50% to 100% represented by the fourth vector component. Hence, this operation enables placement instructions to be determined once error have been diffused using the octree models. Using a random value in this case effectively provides a white-noise distribution of material compositions over the octree-based error-distributed non-empty voxels.

In another case, a threshold value may be retrieved from a three-dimensional halftone matrix. For example, a three-dimensional halftone matrix may have values that map to volumes of the three-dimensional object. In one case, a three-dimensional halftone matrix may be generated and/or retrieved that has threshold values for voxels that correspond to print resolution voxels. The comparison with the cumulative representation in this case is the same as set out for the random number case. Using a threshold value from a three-dimensional halftone matrix enables a distribution of material compositions following error diffusion that is based on the pre-determined properties of the three-dimensional halftone matrix, e.g. the matrix may implement a particular object structure or material distribution. The matrix may, in one case, comprise a void-and-cluster matrix.

As an alternative, the placement instructions may be determined using a pre-halftoned sum of densities as an initializer for the available-volume tracking octree model. In this case, errors may be diffused directly into those pre-halftoned voxels, distributing error with a mask sized with respect to the density of the particular material composition that was placed at the multi-material location. This case may help to guarantee that a pre-computed amount of each material is correctly placed and ensure a uniformity of distribution. For example, if a region needs 10% material A, and 10% material B, in order to achieve an ideal spatial distribution, a sum of material densities may be used to pre-halftone as one material (e.g. in this example, creating a 20% voxel distribution). Then, a buffer of the available-volume tracking octree model is initialized so that locations of the 20% pre-halftoned voxels are open to receive voxels of either material A or B. Then, the halftoning of A and B using error diffusion occurs as discussed, with error distributed with a mask that is appropriate for 10% density.

In any case, a result of sub-block 550 is a set of material composition placement instructions. These are output at sub-block 560. For example, this may specify discrete amounts of material, e.g. as arrange-able by the additive manufacturing system, whether individually or in combination.

Certain examples described herein enable accurate control and flexible placement of volumetrically defined printing material and material combination quantities. Certain examples achieve this at controllable levels of complexity, enabling efficient processing resource assignments (e.g. in terms of processors and/or memory of the additive manufacturing system). An object produced according to the systems and/or methods discussed may exhibit specific and freely-variable use of material and material combinations on a per-voxel basis together with object geometry-tracking homogeneity and/or connected placement of printed voxel content.

Figure 6:
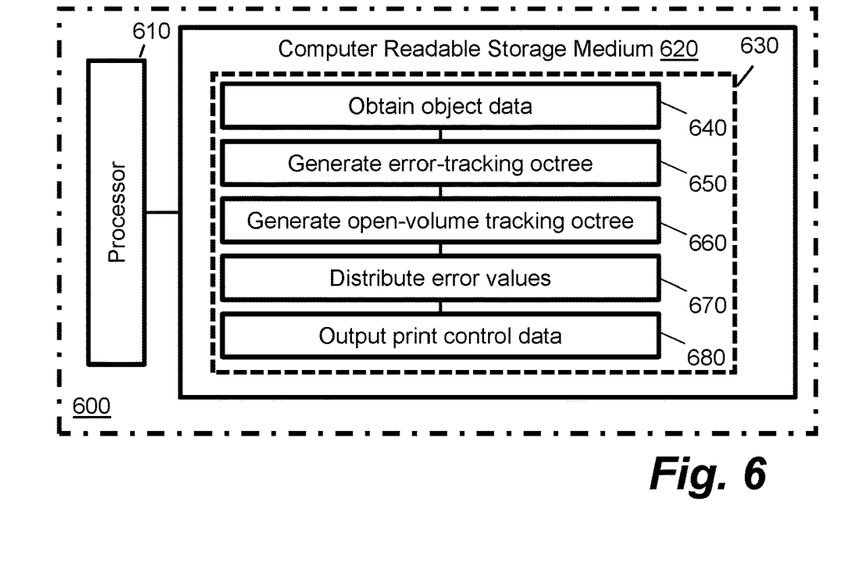
FIG. 6 is a schematic diagram showing a computing device according to an example.

Certain system components and methods described herein may be implemented by way of machine readable instructions that are storable on a non-transitory storage medium. FIG. 6 shows an example of a three-dimensional printing system or device 600 comprising at least one processor 610 arranged to retrieve data from a computer-readable storage medium 620. The system may comprise part of an object production system such as an additive manufacturing system. In one case, device 600 may correspond to the object processor 140 of FIG. 1. The computer-readable storage medium 620 comprises a set of computer-readable instructions 630 stored thereon. In certain cases instructions 630 and 665 may be stored on separate media. The at least one processor 610 is configured to load the instructions 630 into memory for processing. The instructions 630 are arranged to cause the at least one processor 610 to perform a series of actions. These actions may implement the method of FIG. 3.

Instruction 640 is arranged to obtain object data for a three-dimensional object to be printed. The object data comprises material composition values for voxels of the three-dimensional object, wherein each voxel has a set of material values corresponding to a set of material compositions that are printable by the three-dimensional printing system. In this example, each material value represents a percentage (e.g. a decimal between 0 and 1 or a real number between 0 and 100) and the set of data values for each voxel sum to unity (which respectively maybe 1 or 100). Instruction 650 is configured to cause the processor 610 to generate an error-tracking octree data structure. A highest-resolution layer of the data structure corresponds to voxels of the three-dimensional object and each cell in said layer comprises the material values from the obtained object data. Cells or nodes in lower-resolution layers of the data structure then comprise weighted sums of material values associated with linked cells of higher-resolution layers.

Instruction 660 is configured to cause the processor 610 to generate an open-volume tracking octree data structure configured to track volumes of the three-dimensional object. Instruction 670 is then configured to cause the processor 610 to distribute error values from the error-tracking octree data structure to open-volumes designated by the open-volume tracking octree data structure to determine a material composition to print for each voxel of the three-dimensional object. This may be performed as described above. Instruction 680 is lastly configured to cause the processor 610 to output print control data for the three-dimensional printing system based on the determined material compositions, the print control data being useable to print the three-dimensional object. For example, the print control data may comprise the previously described manufacturing control data that may be used by deposit controller 130 or 230 in FIG. 1 or 2.

In one case, the instructions 630 also comprise instructions to cause the processor to, for each voxel where a material composition is determined, indicate that a corresponding cell at a highest-resolution layer in the open-volume tracking octree data structure is closed. In this way control may be placed over where an error is diffused to enforce a predetermined connectivity specification or constraint.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching.

What is claimed is:

1. An additive manufacturing system comprising:
a deposit mechanism to deposit a plurality of materials to generate a three-dimensional object;
a deposit controller to control the deposit mechanism based on manufacturing control data,
the manufacturing control data indicating placement instructions for the plurality of materials; and
an object processor to obtain object data for the three-dimensional object and to generate the manufacturing control data for the deposit controller,
wherein the object processor is arranged to obtain object data comprising material volume coverage vectors,
each material volume coverage vector corresponding to a respective volume of the three-dimensional object and defining a probabilistic distribution of the plurality of materials including combinations of said materials,
wherein the object processor is arranged to access:
a first octree data structure to track a placement error when generating the manufacturing control data; and
a second octree data structure to track volumes that are to be assigned placement instructions,
wherein the object processor is arranged to populate a bottom level of the first octree data structure with at least a portion of the data values for the material volume coverage vectors and to generate the manufacturing control data by distributing error values from the first octree data structure to available volumes represented in the second octree data structure.

2. The additive manufacturing system of claim 1, wherein the object processor is arranged to determine non-blank voxels in the obtained object data and to generate the first and second octree data structures based on the non-blank voxels.

3. The additive manufacturing system of claim 1, comprising:
a substrate supply mechanism to supply at least one substrate layer upon which the plurality of materials are deposited by the deposit mechanism.

4. The additive manufacturing system of claim 3, wherein:
the substrate supply mechanism comprises a powdered substrate supply mechanism,
the deposit mechanism comprises an inkjet deposit mechanism arranged to deposit a plurality of agents upon defined areas within a plurality of successive substrate layers, and
the additive manufacturing system comprises a fixing system arranged to apply energy to form portions of the three-dimensional object from combinations of the agents and the powdered substrate.

5. The additive manufacturing system of claim 1, wherein the object processor is arranged to configure the second octree data structure to implement a defined connectivity pattern.

6. A method of determining material placement for production of a three-dimensional object comprising:
obtaining data values for a plurality of material volume coverage vectors, each material volume coverage vector corresponding to a respective volume of the three-dimensional object and defining a probabilistic distribution of materials available to an additive manufacturing system for production of the three-dimensional object including combinations of said materials;
generating an error tracking octree model and an available-volume tracking octree model for determining placement of the materials available to the additive manufacturing system, wherein a bottom level of the error tracking octree model comprises at least a portion of the data values for the plurality of material volume coverage vectors; and
generating manufacturing control data indicative of placement instructions for the materials available to the additive manufacturing system by distributing error values from the error tracking octree model to available volumes represented in the available-volume tracking octree model.

7. The method of claim 6, comprising:
determining placement frequencies for the materials available to the additive manufacturing system based on the obtained data values by summing components of the material volume coverage vector across a total volume of the three-dimensional object,
wherein the error tracking octree model and the available-volume tracking octree model are generated based on the placement frequencies.

8. The method of claim 7, comprising:
determining an order of placement for the materials available to the additive manufacturing system based on the determined placement frequencies;
wherein the error tracking octree model and the available-volume tracking octree model are generated based on the order of placement.

9. The method of 6, wherein a level of the error tracking octree model higher than the bottom level comprises weighted sums of material volume coverage vector values associated with corresponding cells of the octree at a lower level.

10. The method of 6, wherein generating the error tracking octree model and the available-volume tracking octree model comprises:
determining volumes associated the three-dimensional object than have non-blank values,
wherein generating the error tracking octree model, the available-volume tracking octree model and the manufacturing control data is performed in relation to the determined volumes.

11. The method of 10, wherein generating manufacturing control data comprises:
- normalizing material volume coverage vector values following error distribution based on an exclusion of a blank vector component;
- determining cumulative representations of the normalized material volume coverage vector values; and
- using the cumulative representations to determine a material or a material combination to place at an available volume.

12. The method of claim 11, wherein using the cumulative representations comprises one of:
- comparing each cumulative representation to a threshold value and selecting a vector component from the cumulative representation that represents a range associated with the threshold value,
- wherein the threshold value comprises one of a random number and a threshold value from a three-dimensional halftone matrix.

13. A non-transitory computer-readable storage medium storing instructions that, if executed by a processor of a three-dimensional printing system, cause the processor to:
- obtain object data for a three-dimensional object to be printed,
  - the object data comprising material composition values for voxels of the three-dimensional object,
  - wherein each voxel has a set of material values corresponding to a set of material compositions that are printable by the three-dimensional printing system,
  - wherein each material value represents a percentage and the set of data values for each voxel sum to unity;
- generate an error-tracking octree data structure,
  - wherein a highest-resolution layer of the data structure corresponds to voxels of the three-dimensional object and each cell in said layer comprises the material values from the obtained object data, and
  - wherein cells in lower-resolution layers of the data structure comprise weighted sums of material values associated with linked cells of higher-resolution layers;
- generate an open-volume tracking octree data structure configured to track volumes of the three-dimensional object;
- distribute error values from the error-tracking octree data structure to open-volumes designated by the open-volume tracking octree data structure to determine a material composition to print for each voxel of the three-dimensional object; and
- output print control data for the three-dimensional printing system based on the determined material compositions, the print control data being useable to print the three-dimensional object.

14. The medium of claim 13, wherein the instructions are configured to cause the processor to:
- for each voxel where a material composition is determined, indicate that a corresponding cell at a highest-resolution layer in the open-volume tracking octree data structure is closed.

15. The medium of claim 13, wherein the instructions are configured to cause the processor to:
- configure values of the open-volume tracking octree data structure during error distribution based on a defined connectivity specification.

* * * * *

UNITED STATES PATENT AND TRADEMARK OFFICE
CERTIFICATE OF CORRECTION

PATENT NO. : 10,343,335 B2
APPLICATION NO. : 15/564405
DATED : July 9, 2019
INVENTOR(S) : Jan Morovic et al.

Page 1 of 1

It is certified that error appears in the above-identified patent and that said Letters Patent is hereby corrected as shown below:

In the Claims

In Column 14, Line 54, in Claim 9, delete "of" and insert -- of claim --, therefor.

In Column 14, Line 59, in Claim 10, delete "of" and insert -- of claim --, therefor.

In Column 15, Line 1, in Claim 11, delete "of" and insert -- of claim --, therefor.

Signed and Sealed this
Fifteenth Day of October, 2019

Andrei Iancu
*Director of the United States Patent and Trademark Office*